Patented Jan. 2, 1934

1,942,160

UNITED STATES PATENT OFFICE 1,942,160

PROCESS FOR RECOVERING ALKALOIDS FROM COCOA PRODUCTS

Jules Bebie, St. Louis, John W. Livingston, Kirkwood, and Max Luthy, St. Louis, Mo., assignors, by mesne assignments, to Monsanto Chemical Company, a corporation of Delaware No Drawing. Application September 23, 1927
Serial No. 221,613

9 Claims. (Cl. 87—28)

Ths invention relates to the recovery of alkaloids from cocoa products, such as cocoa press cake, cocoa expeller cake and defatted cocoa waste.

The main object of our invention is to provide an inexpensive and easily controlled process for recovering alkaloids from cocoa products, that insures a relatively high yield of theobromine.

Another object is to provide a rapid commercial process for extracting practically all of the alkaloids from cocoa products of the kind mentioned and converting the residue into cattle food or fertilizer.

Briefly stated, our process consists in subjecting a cocoa product, such as cocoa press cake or expeller cake to an acid treatment which changes the texture of same and also tends to liberate that part of the theobromine which is present in the cocoa material as a glucoside or other compound, hen extracting the alkaloids from the cocoa material by means of an aqueous suspension of alkaline earth metal oxide or hydroxide or a suitable basic substance, then separating the solid particles of cocoa material from the water containing the theobromine and caffein by filtration, decantation or in any other suitable way, and thereafter recovering the theobromine and the caffein from the filtrate or extract by any conventional or known procedure.

The acid treatment used to change the texture of the cocoa material and liberate part of the theobromine is preferably effected by subjecting the cocoa material to the action of a suitable mineral acid or mineral acid anhydrides, such, for example, as sulphuric acid, hydrochloric acid, phosphoric acid or sulphur dioxide, preferably at or near the boiling temperature of water. If desired, however, the acid treatment can be carried out at higher temperatures under pressure. By this step of the process the slimy or colloidal material of the cocoa product is coagulated or changed in such a way that the solid particles of the cocoa material will separate readily from the water that contains the alkaloids, thereby permitting the use of filters to separate the sludge from the extract, due to the fact that the suspension will filter rapidly.

The extraction step of the process can be carried out in various ways without departing from the spirit of our invention, but one procedure that we have found to be very efficient consists in mixing the acid treated cocoa material with a sufficient quantity of lime to neutralize the acid left in the cocoa from the previous acid treatment and also the acid products contained in the cocoa, and to form calcium salts with the theobromine. This procedure yields a suspension which filters rapidly. If desired, the amount of lime or alkaline earth metal oxide or hydroxide that is added to the acid treated cocoa material can be so regulated that there is just sufficient basic material present to neutralize all of the acids, but not to form a calcium salt with theobromine. When such procedure is used the extraction of the alkaloids is made with water alone, maintained near the boiling point of water, the theobromine being sufficiently soluble in hot water to insure its extraction from the cocoa material. Still another way of carrying out the extraction step of the process is to use just enough lime or other alkaline earth metal oxide or hydroxide to neutralize the acids in the cocoa, and then dissolving out the alkaloids with weak bases, such, for example, as ammonium hydroxide, or other basic compounds that are capable of forming a water soluble salt with theobromine without affecting the rapid filtration of the suspension of cocoa. Caustic alkalis, such, for example, as sodium hydroxide, is not well adapted for use in our process, on account of its deleterious action on cocoa material. While we prefer to use alkaline earth metal oxide or hydroxide as previously described, other basic substances can be used in this step of the process, providing they are of such a character that they will neutralize the acidic products in the cocoa material and form a free filtering suspension with the solution of alkaloid or alkaloid salts.

The next step of the process consists in separating the solid particles of the cocoa material from the liquid which contains the theobromine and caffein. This is effected preferably by filtration, the extract obtained by filtering the suspension of cocoa material containing the theobromine in solution either in the salt form or as free alkaloid, depending upon the procedure used in the extraction step.

Any preferred procedure can be used to recover the theobromine. Preferably, the filtrate or extract is cooled, whereby the theobromine crystallizes. If the extraction has been carried out in alkaline solution, the theobromine is recovered by neutralizing the extract with a substance or substances capable of neutralizing the alkalinity, whereby theobromine precipitates out. One procedure which is especially suited to the recovery of theobromine of good quality consists in neutralizing the alkalinity of the extract and treating the calcium salt of theobromine with carbon dioxide at a temperature between about 80° and 100° C., thereby precipitating a finely-divided calcium carbonate which absorbs impurities. After filtration from the calcium carbonate the theobromine crystallizes in good quality from the filtrate on cooling. An additional purification can be obtained by adding sodium carbonate to the extract either before or after the neutralization of the alkalinity with carbon dioxide. The soda ash reacts with the soluble calcium salts contained in the extract and forms calcium carbonate which also assists in improving the purity of the theobromine. After the precipitation and crystallization of the theobromine from the extract is completed, it is recovered by filtration.

The foregoing general description of our process sets forth the essential characteristics of our process. When the process is practised on a commercial scale, it is customary to treat the filter cake constituting the residue of the extraction step so as to obtain a practically complete recovery of the alkaloids. This can be accomplished conveniently by washing the filter cake with water or a dilute solution from the process, then repulping the filter cake with water, and thereafter heating and filtering the suspension. It is also customary to further treat the filtrate from which the crystallized theobromine is recovered, hereinafter referred to as the first filtrate, so as to obtain a second crop of theobromine, this being effected by evaporating said filtrate to about one-fifth of its volume, and then cooling it, whereupon a second crop of theobromine will be obtained. This second crop is filtered off and the second filtrate may be used for the recovery of caffein by extraction, for instance, with organic solvents.

Usually, the extracted solution, which contains valuable fertilizer constituents, will be mixed with the extracted filter cake. The wet material can be used directly as a fertilizer, or it can be dried and ground and used in this form as fertilizer or cattle food. The drying is advantageously done by exposing the wet material to flue gases containing carbon dioxide or other acidic compounds which neutralize the free lime contained in the cake.

The second crop of theobromine is usually rather impure, but it can be purified easily by first dissolving the crude theobromine in water as the calcium or alkali earth salt and filtering the solution and precipitating from the filtrate the theobromine by acidification. Instead of filtering the solution the calcium or alkali earth salts can be treated with sodium carbonate and the suspension filtered from the calcium or alkali earth carbonate.

The following specifies the procedure we prefer to use in practising our process, but it is to be understood that this procedure can be modified without departing from the spirit of this invention.

Example.—100 lbs. of cocoa product, such, for instance, as cocoa press cake, or expeller cake or defatted cocoa waste, is mixed with 25 gallons of water and 14 lbs. 20° Baumé hydrochloric acid and then heated with live steam to a temperature near the boiling temperature, for example, a temperature near 100° C. If the acid used is insufficient to maintain an acid reaction, more acid is added. The batch is kept at or near the boiling point for 5–6 hours and is then diluted to a total volume of 85–90 gallons with water. Hydrated lime is then added to neutralize the acid and acid products of the cocoa until the batch shows a slight alkalinity. About 20 lbs. of hydrated lime are required. After stirring for about 30 minutes the batch is filtered, thereby obtaining a filter cake composed of the solid particles of the cocoa material, and a filtrate (referred to as the first filtrate) that contains the cocoa alkaloids.

The theobromine is recovered from said first filtrate or extract by acidifying with hydrochloric acid or carbon dioxide. If carbon dioxide is used, the extract is preferably filtered at boiling temperature to avoid crystallization of the theobromine with the calcium carbonate precipitate. The filtrate is cooled, whereby the theobromine crystallizes out. If the extract is acidified with an acid which forms a water soluble calcium salt, the acidification can be done at any temperature and no filtration is required.

The filter cake constituting the solid residue of the extraction step of the process is washed with about 15 gallons of warm water and is then made up with fresh water to the original volume of 85–90 gallons. Thereafter, this solution or suspension is filtered so as to recover any alkaloids that remain in the filter cake, the filtrate of this operation being retained for subsequent use in making up the next batch of filter cake that is treated. The filtrate from which the crystallized theobromine is recovered is evaporated to about one-fifth of its volume, and it is then cooled so as to yield a second crop of theobromine. The second filtrate constituting the residue of this operation may be extracted with benzol or other suitable solvents to recover the caffein and may then be mixed with the extracted filter cake and used either directly or after drying as a cattle food or fertilizer.

Having thus described our invention, what we claim and desire to secure by Letters Patent is:

1. The process for recovering alkaloids from cocoa products which consists in simultaneously liberating the alkaloids and rendering the cocoa product more readily filterable by treating said cake at an elevated temperature with an aqueous acid solution while maintained near the boiling point, neutralizing the acid, extracting the alkaloids by means of an aqueous medium at a temperature near the boiling point thereof and finally separating the suspended matter from the aqueous medium.

2. In a process for recovering alkaloids from cocoa waste products which are substantially free from cocoa fats, the steps which include treating the cocoa product with a dilute aqueous acid solution maintained at a temperature of approximately 100° C., neutralizing the mixture, dissolving the alkaloids by means of an aqueous solution of a water soluble alkaline earth metal base, separating the insoluble matter from the solution, adding an acid reacting material to the solution in an amount sufficient to react with the dissolved base without precipitating the theobromine and finally recovering the theobromine from its solution.

3. In a process for recovering theobromine from cocoa waste products which are substantially free from cocoa fats, the steps which include treating the cocoa product with a dilute aqueous acid solution maintained at a temperature of approximately 100° C., neutralizing the mixture, dissolving the theobromine by means of an aqueous solution of a water soluble alkaline earth metal base and separating the insoluble matter from the solution which contains the theobromine precipitating the dissolved alkaline earth metal base in the form of its carbonate without precipitating the theobromine, separating the solution from the precipitate, and finally recovering the theobromine from its solution.

4. In a process for recovering theobromine from cocoa waste products which are substantially free from cocoa fats by means of a water soluble alkaline earth metal base according to which one obtains an aqueous basic solution containing theobromine, the steps which comprise separating the insoluble matter from the said solution, adding an acid reacting material to the solution in an amount sufficient to react with the dissolved base without precipitating the theobromine and finally recovering the theobromine from its solution.

5. In a process for recovering theobromine from cocoa waste products which are substantially free from cocoa fats by means of a water soluble alkaline earth metal base according to which one obtains an aqueous basic solution containing the theobromine, the steps which comprise separating the insoluble matter from said solution, precipitating the dissolved alkaline earth metal base in the form of its carbonate without precipitating the theobromine, filtering the resulting suspension, and recovering the theobromine from the filtrate.

6. In a process for recovering theobromine from cocoa waste products which are substantially free from cocoa fats by means of a water soluble alkaline earth metal base according to which one obtains an aqueous basic solution containing theobromine, the steps which comprise separating the insoluble matter from said solution, acidifying the solution by means of an acid whose corresponding alkaline earth metal salt is completely soluble in the solution while maintaining an elevated temperature and recovering the theobromine so liberated from the solution.

7. In a process for recovering theobromine by means of a water soluble alkaline earth metal base from cocoa wastes from which substantially all of the cocoa fats have been removed, according to which one obtains an aqueous alkaline earth metal base solution containing the theobromine, the steps which include separating the insoluble cocoa waste matter from the solution, precipitating the dissolved alkaline earth metal base in the form of its carbonate, filtering the resulting alkaline earth metal carbonate suspension while avoiding the precipitation of the theobromine and finally recovering the theobromine from the filtrate.

8. In a process for recovering theobromine by means of a water soluble alkaline earth metal base from cocoa wastes from which substantially all of the cocoa fats have been removed, according to which one obtains an aqueous alkaline earth metal base solution containing the theobromine, the steps which include separating the insoluble cocoa waste matter from the solution, precipitating the dissolved alkaline earth metal base by means of carbon dioxide, filtering the resulting suspension of alkaline earth metal carbonate, while avoiding precipitation of the theobromine from its solution and finally recovering the theobromine from the filtrate.

9. In a process for recovering theobromine from cocoa waste by means of a water soluble alkaline earth metal base, the preliminary step of rendering the cocoa waste more readily susceptible to the base treatment and of rendering it filterable which comprises treating said cocoa waste at temperature near the boiling point thereof with muriatic acid.

JULES BEBIE.
JOHN W. LIVINGSTON.
MAX LUTHY.